3,378,525
EPOXY RESINS FROM POLYHYDRIC PHENOL-
TERPENE ADDITION PRODUCTS
Ralph F. Sellers, Somerset, N.J., assignor to Union
Carbide Corporation, a corporation of New York
No Drawing. Filed Dec. 3, 1964, Ser. No. 415,821
8 Claims. (Cl. 260—47)

ABSTRACT OF THE DISCLOSURE

This invention relates to a polyglycidylether of a polyhydric phenol, which phenol has at least two phenolic hydroxyl groups per molecule and is derived from a phenol and a cyclic terpene.

---

This invention relates to epoxy resins. More specifically, this invention relates to polyglycidylethers of polyhydric phenols derived from phenols and terpenes, and to cured products obtained therefrom which are characterized by excellent physical properties, in particular, by excellent heat distortion temperatures and by excellent impact strengths.

Currently, there is no epoxy resin known which, in its infusible state, is characterized by both excellent heat distortion temperature and excellent impact strength. These two desirable properties are not coextensive in known epoxy resins. To the contrary, known epoxy resins, in their infusible state, which are characterized by improved heat distortion temperatures are also characterized by poor impact strengths; and those characterized by improved impact strengths are characterized by poor heat distortion temperatures.

In an attempt to provide epoxy resin systems which will cure to infusible products characterized by improved heat distortion temperatures and by improved impact strengths, various curing agents, such as carboxylic acid anhydrides, polythiols and polyamides, have been suggested for use therewith. It has been found, however, that these and other comparable curing agents are specific in their effect. That is, a curing agent such as phthalic acid anhydride or maleic acid anhydride, although effecting a cure of an epoxy resin to an infusible product of improved heat distortion temperature, will also effect a degradation of the impact strength of the cured product. On the other hand, curing agents, such as polythiols and polyamides, which will effect a cure of epoxy resins to cured products of improved impact strength will also effect a degradation of the heat distortion temperatures thereof.

Furthermore, in many instances, materials added to epoxy resins for the purpose of improving the impact strengths and heat distortion temperatures of cured products obtained therefrom, have actually degraded other properties of the cured products such as hardness, tensile strength, flexural strength, compressibility and the like.

The present invention provides epoxy resins which self-cure to infusible products characterized by excellent impact strengths and by excellent heat distortion temperatures. In addition, the epoxy resins of this invention can be used in conjunction with epoxy curing agents, e.g., amine hardeners without undergoing any degradation with respect to their desirable properties.

The epoxy resins of this invention comprise a polyglycidylether of a polyhydric phenol having at least two phenolic hydroxyl groups per molecule which is derived from a phenol and a terpene, the polyglycidylether having an epoxy equivalency greater than one.

Any cyclic terpene, substituted or unsubstituted, which has at least one double bond per molecule can be used for purposes of this invention. Particularly desirable cyclic terpenes are those having the basic empirical formula:

$$C_{10}H_{16}$$

Illustrative of suitable terpenes are the following: dl-limonene, α-pinene, α-cymene, α-terpinene, β-pinene and the like; terpene alcohols such as α-terpineol, isopulegol and the like. It is to be understood that those compounds which rearrange under the influence of heat to cyclic terpenes having at least one double bond can also be used. For example, isoprene, an unsaturated aliphatic hydrocarbon, will dimerize under reaction conditions involving a phenol, to dl-limonene, a cyclic terpene having two unsaturated bonds per molecule, which in turn will react with a phenol to form a polyhydric phenol suitable for purposes of this invention.

Monohydric, as well as polyhydric, and mononuclear, as well as polynuclear phenols, can be reacted with a terpene to produce the polyhydric phenols which are subsequently reacted with an epihalohydrin to yield the epoxy resins of this invention. Among suitable monohydric, mononuclear phenols can be noted; phenol, and those phenols having the general formula:

Formula I

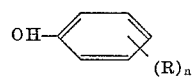

wherein $n$ is an integer having a value of 0 to 4 inclusive, each R, which can be the same or different, is an alkyl radical containing from 1 to 6 carbon atoms inclusive, an alkoxy radical containing from 1 to 6 carbon atoms inclusive, or a halogen, i.e., chlorine, bromine, iodine, and fluorine; with the proviso that at least one position other than meta to the hydroxyl group is unsubstituted.

Specific phenols falling within the scope of Formula I are: alkylated phenols, exemplary of which are m-cresol, o-ethyl phenol, m-ethyl phenol, p-isopropyl phenol, m-tert.-butyl phenol, o-amyl phenol, p-n-hexyl phenol, 2,4-dimethyl phenol, 2,6-diethyl phenol, 2,4-di-n-hexyl phenol, 2,6-di-n-hexyl phenol, 2,3,5-triethyl phenol, 2,3,5-trihexyl phenol, 2,3,5,6-tetramethyl phenol, 2,3,4,5-tetra-n-hexyl phenol, and other like phenols, as well as the commercially available meta-cresol which contains small amounts of both the para and the ortho isomers; alkoxylated phenols, exemplary of which are m-methoxy phenol, o-methoxy phenol, p-methoxy phenol, m-n-hexoxy phenol, o-n-hexoxy phenol, p-n-hexoxy phenol, 2,4-dimethoxy phenol, 2,6-diethoxy phenol, 2,4-di-n-hexoxy phenol, 2,6-di-n-hexoxy phenol, 2,3,5-trimethoxy phenol, 2,3,5-tri-n-hexoxy phenol, 2,3,5,6-tetramethoxy phenol, 2,3,4,5-tetra-n-hexoxy phenol, and the like: halogenated phenols such os ortho, meta or para chloro phenol, ortho, meta or para bromo phenol, 2,6-dichlorophenol, 2,4-dichlorophenol, 2,3,5-trichlorophenol, 2,3,5,6-tetrachlorophenol, and the like.

Illustrative of suitable polyhydric phenols are resorcinol, catechol, and the like as well as polyhydric, polynuclear phenols having the formula:

Formula II

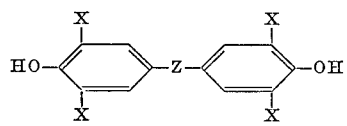

wherein Z is a divalent radial, as for example, sulfur, oxygen, alkylidene, alkylene and the like and each X is hydrogen or as defined for R of Formula I, with the proviso that at least one X is hydrogen.

Exemplary of specific polyhydric, polynuclear phenols are the following: bis(hydroxyphenyl)alkanes such as 2,2-bis(p-hydroxyphenyl)propane, commonly referred to as Bisphenol A, 2,4'-dihydroxydiphenylmethane,
bis(2-hydroxyphenyl)methane,
bis(4-hydroxyphenyl)methane,
1,1-bis(4-hydroxyphenyl)ethane,
1,1,2-bis(4-hydroxyphenyl)ethane,
1,1-bis(4-hydroxy-2-methylphenyl)ethane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl)-1,2-bis(phenyl)propane,
2,2-bis(4-hydroxyphenyl)-1-phenylpropane and the like; dihydroxy biphenyls such as 4,4'-dihydroxybiphenyl, 2,2'-dihydroxybiphenyl, 2,4'-dihydroxybiphenyl and the like; di(hydroxyphenyl)sulfones such as bis(4-hydroxyphenyl)sulfone, 2,4' - dihydroxydiphenyl sulfone, 5'-methyl-2,4'-dihydroxydiphenyl sulfone, 5'-ethyl-4,4'-dihydroxydiphenyl sulfone, 3' - methyl - 4,4' - dihydroxydiphenyl sulfone and the like; di(hydroxyphenyl)ethers such as bis(4-hydroxyphenyl)ether and the like.

The polyhydric phenols which are epoxidized to the epoxy resins of this invention can be conveniently prepared by reacting a phenol and a terpene in a manner described in U.S. Patent 2,471,455 to Alford L. Rummelsburg and also in a manner as described in this specification. As a rule, at least 2 moles of a phenol, per mole of terpene, are admixed in the presence of a suitable catalyst, such as an ion exchange resin, e.g., sulfonated styrene-divinyl benzene copolymer, sulfonated crosslinked styrene polymers and the like. The reaction is indicated by the equation below wherein, for purposes of illustration, phenol and dl-limonene are shown as the reactants

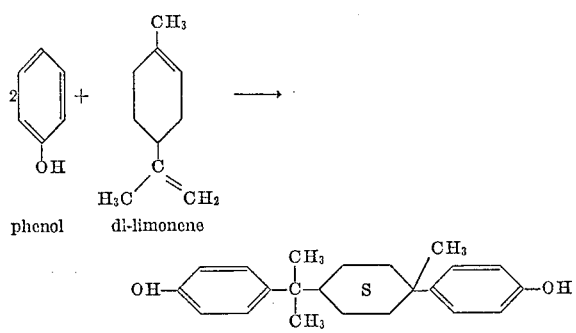

The epoxidation of the polyhydric phenol is conveniently accomplished by reacting a mixture containing the desired polyhydric phenol and an epihalohydrin in a manner as described in U.S. Patent 2,943,095 to Alford G. Farnham, the disclosure of which is incorporated herein by reference, and also as further described in this specification. In the epoxidation reaction each hydrogen of each phenolic hydroxyl group is replaced, theoretically, by a glycidyl radical.

The epoxy resins of this invention can be cured to infusible products by heating at elevated temperatures, generally on the order of about 50° C. to about 200° C. Since the self-cure of these resins, at elevated temperatures, requires more than a day, it is customary to add curing agents thereto, prior to the heating cycle, in order to effect a cure in a reasonable period of time. Any of the epoxy curing agents can be used for this purpose. The curing agents can be catalysts, that is, compounds which primarily catalyze the curing reaction, or hardeners, that is, compounds which, in the curing reaction react with the epoxy resin. Suitable hardeners are primary and secondary polyamines, for example, m-phenylenediamine, 4,4'- methylenedianiline and the like, polyamides such as dicyandiamide and the like, polymercaptans, polycarboxylic acids or anhydrides thereof such as maleic anhydride, endo-methylene tetra-hydrophthalic anhydride and the like. Suitable catalysts are tertiary amines such as benzyldimethylamine and the like, quaternary ammonium compounds, boron trifluoride complexes such as boron trifluoride etherate complex, boron trifluoride monoethylamine complex and the like. Primary and secondary amines can act as both hardeners and catalysts, i.e., as combined hardener-catalysts.

The epoxy resins of this invention can be used in every application now served by epoxies, as for example, in epoxy tooling and abrasive wheel applications, in electrical relays, gears and bearings. Also, the epoxy resins of this invention can be used in molding and coating applications and as adhesive binders, bonding together layers of glass cloth and the like to form laminated structures. These laminated structures find use in electrical applications as printed circuit boards and in the encapsulation of electrical components.

The following examples further illustrate the present invention and are not intended to limit the scope thereof in any manner.

In the examples which follow, the polyhydric phenols were prepared as follows:

To a one liter, three-necked flask equipped with a mechanical stirrer, thermometer, heating mantle, reflux column and a dropping funnel, there was added 470 grams (5 moles) of freshly distilled phenol and 250 grams of a sulfonated styrene-benzene ion exchanger resin which had been prepared by replacing, with phenol, substantially all of the water from the catalyst in the acid form. The phenol-catalyst mixture was heated to 70° C.–75° C. and ½ mole of the desired terpene added thereto, dropwise, over a 15–30 minute period. After the exotherm from the reaction had subsided, the temperature of the contents of the flask was maintained at 70° C.–75° C. for an additional five hours. At the end of the five hour period, the reacted mixture was filtered while warm, removing the catalyst. The catalyst was then washed with approximately 250 grams of phenol and the combined filtrate and washings were then distilled at reduced pressures to a final pot temperature of 200° C. at about 1–5 mm. Hg. The polyhydric phenol product was, in each instance, recrystallized from toluene.

Each polyhydric phenol was then expoxidized according to the following procedure.

The desired polyhydric phenol and epichlorohydrin were admixed in a molar ratio of 4 moles of epichlorohydrin per phenolic hydroxyl equivalent and 600 grams of ethyl alcohol added thereto. The temperature of the mixture was mantained at 60° C.–65° C. while a 50 percent aqueous solution of sodium hydroxide was added thereto according to the following schedule.

67 grams of aqueous NaOH after 1 hour
67 grams of aqueous NaOH after 1½ hours
469 grams of aqueous NaOH after 2½ hours
67 grams of aqueous NaOH after 3½ hours The excess epichlorohydrin, alcohol and water were distilled off to conditions of 100° C. (pot temperature) at 50 mm. Hg pressure. The organic portion of the residue was dissolved in 1813 grams of toluene and the toluene solution was then water washed until free of salts and residual alkali. The epoxy resin was then recovered, in each instance, by distilling off the toluene at a temperature of 135° C. and under a pressure of 50 mm. Hg.

EXAMPLE 1

| | |
|---|---|
| Phenol | Phenol. |
| Terpene | α-Pinene. |
| Epoxy assay of epoxy resin | 258 grams/gram equiv. |

EXAMPLE 2

| | |
|---|---|
| Phenol | Phenol. |
| Terpene | dl-Limonene. |
| Epoxy assay of epoxy resin | 266 grams/gram equiv. |

The epoxy resins of Examples 1 and 2 and of a "Control" were cured to infusible products by admixing therewith a stoichiometric amount of a curing agent, made up of a eutectic mixture of m-phenylene diamine and methylene dianiline, and each such mixture cast into molds. The specimens thus cast were then cured and subjected to testing, the results of which are indicated below, along with the particulars of the curing cycle.

The epoxy resin of "Control" was a polyglycidylether of 2,2-bis(p-hydroxyphenyl)propane having an epoxy assay of 190 grams/gram equiv.

A polyglycidylether obtained by epoxidizing a phenol derived from α-terpineol and resorcinol has substantially the same properties, on being cured to an infusible product with the hardening agent of Example 1, as the polyglycidylether of Example 1.

EPOXY RESIN

| | Example 1 | Example 2 | Control |
|---|---|---|---|
| Heat Distortion Temperature ASTM D-648-56 | 188.8° C | 178.7° C | 150.7° C. |
| Izod Impact Strength ASTM D-256-56 | 0.47 ft.-lb./in | 0.40 ft.-lb./in | 0.31 ft.-lb./in. |
| Flexural Strength | 13,500 p.s.i | 14,500 p.s.i | 15,000 p.s.i. |
| Flexural Modulus ASTM D-790-58T | 373,000 p.s.i | 397,000 p.s.i | 408,000 p.s.i. |
| Tensile Strength | 9,700 p.s.i | | 10,300 p.s.i. |
| Tensile Modulus | 370,000 p.s.i | | 392,000 p.s.i. |
| Tensile Elongation ASTM D-638-58T | 4.3 percent | | 4.8 percent. |
| Compression Strength ASTM D-695-54 | 19,700 p.s.i | 20,200 p.s.i | 18,400 p.s.i. |
| Curing Cycle | 100° C.—12 hours / 160° C.—4 hours | 100° C.—12 hours / 100° C.—4 hours | 100° C.—12 hours. / 165° C.—4 hours. |

What is claimed is:

1. A polyglycidylether of a polyhydric phenol, said phenol being the addition product of a polyhydric phenol and a cyclic terpene which has at least one double bond per molecule, said polyglycidylether having an epoxy equivalency greater than one.

2. A polyglycidylether as defined in claim 1 wherein the phenol has the formula:

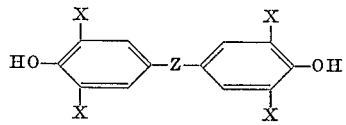

wherein Z is a divalent radical or a valence bond and each X is hydrogen or halogen or alkyl having 1 to 6 carbon atoms inclusive or alkoxy having 1 to 6 carbon atoms inclusive, with the proviso that at least one position other than meta is unsubstituted.

3. The cured product of the polyglycidylether defined in claim 1.

4. A polyglycidylether as defined in claim 1 wherein the terpene has the emperical formula:

$$C_{10}H_{16}$$

5. A polyglycidylether as defined in claim 1 wherein the terpene is dl-limonene.

6. A polyglycidylether as defined in claim 1 wherein the terpene is α-pinene.

7. A polyglycidylether as defined in claim 1 wherein the terpene is α-terpineol.

8. A polyglycidylether as defined in claim 1 wherein the phenol is resorcinol.

References Cited

UNITED STATES PATENTS

2,811,564   10/1957   Bader _____ 260—47

WILLIAM H. SHORT, *Primary Examiner.*

T. D. KERWIN, *Assistant Examiner.*